United States Patent [19]

Giacobbe

[11] Patent Number: 4,994,436
[45] Date of Patent: Feb. 19, 1991

[54] PROCESS FOR SAFELY DESTROYING ORGANIC BINDERS IN CERAMIC COMPONENTS DURING THE FIRING PROCESS

[75] Inventor: F. W. Giacobbe, Naperville, Ill.

[73] Assignee: American Air Liquide, New York, N.Y.

[21] Appl. No.: 321,833

[22] Filed: Mar. 10, 1989

[51] Int. Cl.$^5$ .................. C04B 35/64; H01C 39/12
[52] U.S. Cl. .................................... 505/1; 264/63; 264/65; 505/780
[58] Field of Search .............. 264/63, 65, 44, 85; 505/739, 780, 1, 725

[56] References Cited

U.S. PATENT DOCUMENTS

| | | | |
|---|---|---|---|
| 4,622,240 | 11/1986 | Yext et al. | 427/96 X |
| 4,680,153 | 7/1987 | Kinder et al. | 264/63 X |
| 4,778,549 | 10/1988 | Cowan, Jr. et al. | 264/63 X |

OTHER PUBLICATIONS

Ishii et al., "Fabrication of Superconducting $YBa_2Cu_3O_{7-\delta}$ Films by a Tape Casting Method", *Japanese Journal of Applied Physics*, (1987).

Primary Examiner—James Lowe
Assistant Examiner—Christopher A. Fiorilla
Attorney, Agent, or Firm—Oblon, Spivak, McClelland, Maier & Neustadt

[57] ABSTRACT

A process for firing a ceramic structure containing an organic component wherein an inert gas atmosphere containing small quantities of a mild oxidizing agent, e.g. water vapor, carbon dioxide, nitrous oxide or oxygen is passed over the ceramic component. The temperature during this process is sufficiently high to cause either the decomposition or the burning of the organic component and the firing of the ceramic structure.

10 Claims, 1 Drawing Sheet

PROCESS FOR SAFELY DESTROYING ORGANIC BINDERS IN CERAMIC COMPONENTS DURING THE FIRING PROCESS

BACKGROUND OF THE INVENTION

Field of the Invention

The present invention relates to processes for destroying organic binders in ceramic components during the firing process.

Discussion of the Background

Many ceramic objects are made by first mixing organic binders and other organic additives with very fine raw ceramic powders. This mixture is then cast or compressed into a desired shape and then subjected to a high temperature firing procedure.

The main function of the organic binder is to provide the "green" ceramic component with strength and rigidity. These properties are important because they permit the formed components to withstand moderate handling and transportation requirements which the parts may be subjected to between the forming and firing process.

The primary function of the firing process is to sinter the fine compacted raw ceramic powders together, after binder burn out, and thus permanently bond the aggregate mass of fine powder into a compact, dense, and rigid single component item. Typically, the firing process is carried out in an open belt furnace, box furnace, or kiln. Consequently, during the firing process, the ceramic components are exposed to a stagnant or flowing oxygen-rich atmosphere (in most cases, air).

The oxygen-rich atmosphere helps to burn out the organic binders (when they are used) and also facilitates the removal of gaseous products and smoke produced from binder decomposition and pyrolysis. To prevent an explosive reaction between these decomposition products and the oxygen-rich atmosphere, heating rates are carefully controlled.

By this process, combustible gaseous and solid decomposition products are produced so slowly that the influx of fresh air is always great enough to prevent an explosive reaction, the concentration of reactive gases and/or solids being always maintained below the lower explosive limit by dilution. However, this severely limits product production rates because it requires the use of very slow heating rates.

One method of overcoming this disadvantage in production rates is to fire the binder containing products in a chemically inert gas atmosphere (i.e. nitrogen, argon, helium, etc.) instead of air. Then, much more rapid heating rates can be used during the heating stages which precede sintering.

When an inert gas atmosphere is used in this type of process, combustible gases and solids cannot explode because a strong oxidizing agent is not present. Although this technique is very safe, its use can lead to deposits of residual carbon within the sintered ceramic component. In general, residual carbon deposits, within the fired and sintered ceramic components, are undesirable.

There is thus a need for a more efficient process for destroying organic binders in ceramic components during the firing process. Such a process would ideally safely destroy the organic binders and would not require the use of very slow heating rates.

SUMMARY OF THE INVENTION

Accordingly, it is an object of this invention to provide a safe process for destroying organic binders in ceramic components during the firing process.

It is another object of this invention to provide a safe process for destroying organic binders in ceramic components during the firing process which does not require using very slow heating rates.

The inventor has now discovered a process which satisfies all of these objects, and other objects which will become apparent from the description of the invention as given hereinbelow. In this process, a flowing inert gas atmosphere containing controlled quantities of at least one mild oxidizing agent is used during the binder burnout phase of ceramic firing.

BRIEF DESCRIPTION OF THE FIGURE

A more complete appreciation of the invention and many of the attendant advantages thereof will be readily obtained as the same becomes better understood by reference to the following detailed description when considered in connection with the accompanying figure, wherein.

DETAILED DESCRIPTION OF THE PREFERRED EMBODIMENTS

Figure 1:
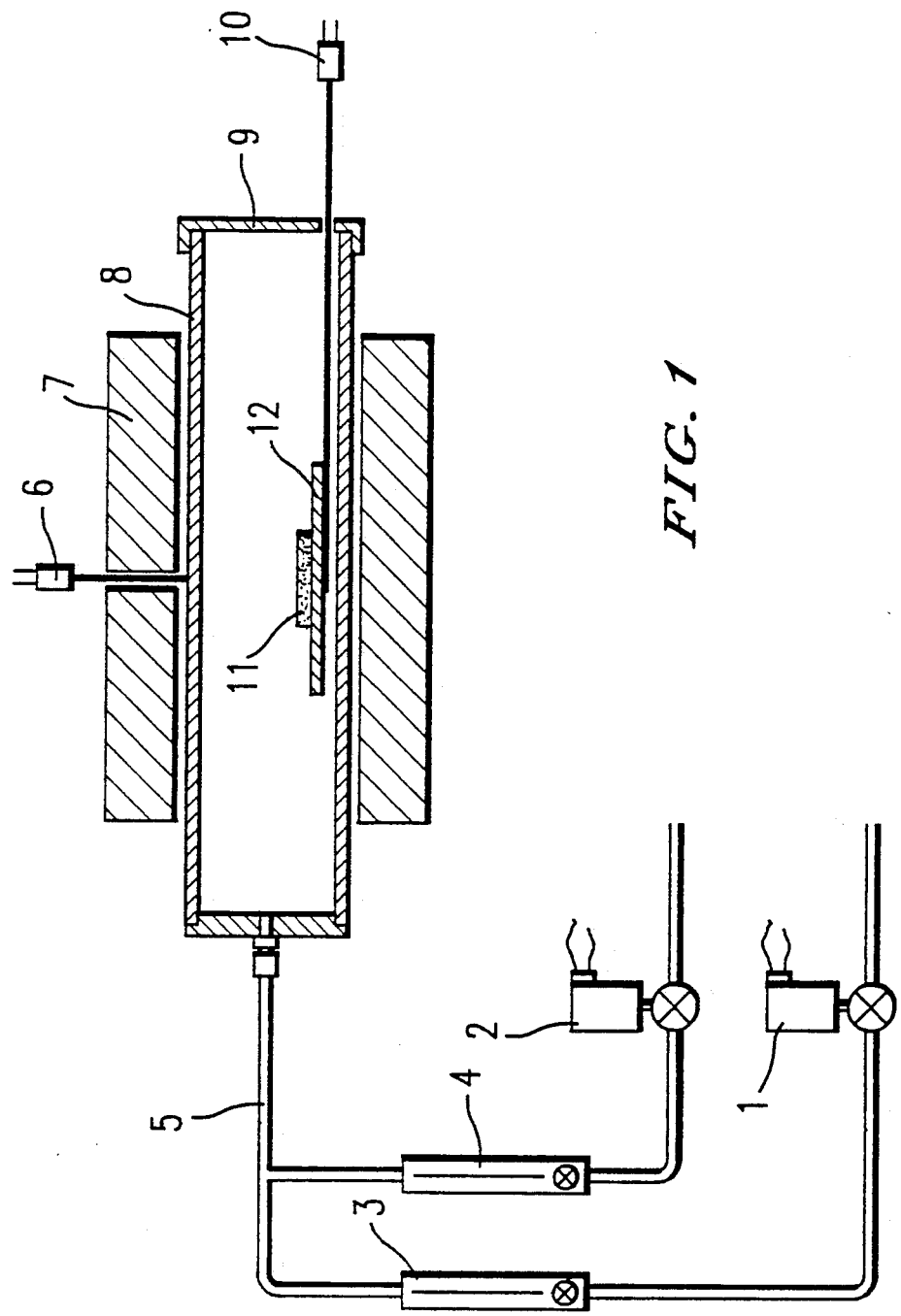
FIG. 1 provides a schematic illustration of a method of firing a "green" ceramic component in an inert gas atmosphere followed by an oxygen-rich atmosphere.

The present invention thus relates to processes for destroying organic binders in ceramic components during the firing process. These binders are typically used to facilitate the production of "green" ceramic components prior to the firing process, which firing process is needed to burn out organic ingredients and also to sinter the raw ceramic powders into a rigid and more permanent structure.

This invention can be used both with ceramic superconductors, as well as any other ceramic material.

The inventor has discovered that the problem of residual carbon deposits which occurs when a chemically inert gas atmosphere is used can be resolved, without resorting to very slow heating rates in air, by adding a controlled amount of a very mild gaseous oxidizing agent(s) to the inert gas processing atmosphere.

The process of the present invention is based on the use of a flowing inert gas atmosphere, which can be, for example, nitrogen, helium or argon, containing controlled quantities of a mild oxidizing agent, during the binder burnout phase of ceramic firing. At the high temperatures used in the burnout phase of ceramic firing operations, this mixture of a mild oxidizing agent in an inert gas is very effective in slowly burning an organic binder without any possibility of explosion.

After all of the organic binder has either decomposed or has been burned by the mild oxidizing agent-containing inert gas, the processing atmosphere can be switched over to either an oxygen-rich atmosphere (>10% v/v oxygen) or pure oxygen. Residual carbon left within the ceramic components after binder decomposition can then be completely burned using this technique.

Mild oxidizing agents in the inert gas can be water vapor, carbon dioxide, and/or nitrous oxide as well as other gases or gas mixtures. Even very small amounts of oxygen in the inert gas can be used, but the use of small amounts of a mild oxidizing other than oxygen is the preferred mode of operation.

Proper selection of the nature of the oxidizing agent and its concentration completely eliminates the danger of an explosive reaction during the binder burnout phase of operation. And at very high temperatures, the small amounts of water vapor, carbon dioxide, nitrous oxide, and/or oxygen are very effective oxidizing agents so that the present process very effectively removes the organic material from the ceramic.

If the oxidizing agent used is water vapor or carbon dioxide, this oxidizing agent is used in an amount of up to 50% by volume in the inert gas atmosphere. If the oxidizing agent is nitrous oxide or oxygen, the oxidizing agent is used in an amount of up to 10% by volume in the inert gas atmosphere. Combinations of these may also be used.

Specific ramping and soaking procedures associated with this process can be empirically tailored to optimize the application of this technique to specific ceramic components.

The process according to this invention thus involves initially firing preformed "green" ceramic components containing organic binders in a pure inert gas, mixture of inert gases, or in an inert gas containing a mild gaseous oxidizing agent. This technique allows very rapid heating rates during the binder burnout phase of thermal processing without any danger due to an explosive reaction between gaseous components in the processing atmosphere and the gaseous and/or solid products produced due to thermal decomposition of the organic binder.

The temperatures used during the burnout phase of thermal processing may be any known temperature used during such processing, and must be at least a temperature sufficiently high to cause the decomposition or burning of the organic components of the binder.

After most or all of the organic binder has been safely destroyed, using the technique described above, the processing atmosphere may be safely switched over to an oxygen-rich atmosphere (>10% v/v) or even pure oxygen, without danger of explosion. Switching over to an oxygen-rich atmosphere may not be necessary in some cases. However in other situations, it will insure the complete removal of substantially all residual carbon and can also lead to a final product having more desirable physical and chemical properties.

It has been discovered experimentally that the present technique can be applied very effectively to the production of the $YBa_2Cu_3O_x$ ceramic superconductor. The subscript, x, in the preceding formula indicates that the oxygen concentration in this material is somewhat uncertain or variable, depending on the exact processing procedure used to prepare this material. In general, the optimum value of x is believed to be approximately 7.0.

In any case, our work has demonstrated that this ceramic material has very good superconducting properties only when the preformed powdered precursors are fired and sintered in oxygen-rich atmospheres. In fact, processing atmospheres consisting of 100% oxygen tend to produce the best superconducting specimens and properties.

Typically, this material is produced without the use of any organic binders. Therefore, in this case, high temperature processing steps in either air or pure oxygen alone are not hazardous. However, in other cases it is desirable to produce "green" specimens using organic binders. The production of these specimens which has heretofore required that they be fired very slowly in air or in pure oxygen is extremely hazardous.

The process of the invention disclosed herein can be applied to the production of very good specimens of the $YBa_2Cu_3O_x$ superconductor as described below. A suitably prepared "green" specimen of the $YBa_2Cu_3O_x$ ceramic superconductor, containing an organic binder, is fired in a flowing atmosphere of an inert gas (i.e. nitrogen, argon, helium, ..., or a mixture thereof) until substantially all of the organic binder has thermally decomposed into gaseous and solid pyrolysis products.

The flowing inert gas atmosphere safely removes these combustible materials from the furnace environment without danger of explosion within the furnace. The inert gas atmosphere may also be doped with one or more mild oxidizing agents to facilitate the removal of residual carbon during this phase of binder removal.

After this part of the process has been completed, the gas processing atmosphere can be safely switched over to an oxygen-rich (containing >10% by volume of oxygen) or pure oxygen atmosphere to remove traces of residual carbon and optimize superconducting properties in the final specimen. This switch over to an oxygen-rich atmosphere can be made at very high temperatures and in all subsequent steps in heating to even higher temperatures, holding the specimens at elevated temperatures for long periods of time. Controlled cooling of the specimens can also be safely performed in an oxygen-rich, or pure oxygen, atmosphere.

The process of the present invention can be used in a configuration where the flowing gas atmosphere is injected in a selected zone, or zones, of a continuous belt furnace as is now currently used, while other zones are subjected to other flowing gas atmospheres.

The process of the invention is shown schematically in FIG. 1. This figure illustrates a simplified method of practicing the invention.

The apparatus illustrated in FIG. 1 comprises an inert gas solenoid valve (1), an oxygen solenoid valve (2), an inert gas flow meter (3), an oxygen flow meter (4), a furnace atmosphere inlet (5), a furnace control thermocouple (6), a furnace heating element in insulation (7), a furnace tube (8), a furnace tube cover (9) which may be made of aluminum foil, a sample thermocouple (10), an optional ceramic sample (11) and a sample support means (12).

Initially, only the inert gas normally closed solenoid (1) is open allowing a predetermined flow of an inert gas (3) to flow through the ceramic tube furnace (8).

After substantially all of the organic binder has been removed from the ceramic sample (11), electrical power causing the inert gas solenoid to stay open is cut off and electrical power needed to open the normally closed oxygen solenoid (2) is activated. This causes a predetermined flow of oxygen (4) to replace the inert gas flow through the tube furnace.

If desired, the inert gas stream may be doped with a predetermined concentration of a mild oxidizing agent (such as water vapor, carbon dioxide, nitrous oxide, etc.) or a mixture of mild oxidizing agents in order to safely facilitate the oxidation of residual-carbon in the ceramic sample prior to switching the gas processing atmosphere over to an oxygen-rich or pure oxygen atmosphere.

Specific temperature ramping and soaking procedures associated with this process can be empirically tailored as is known in this art in order to optimize the application of the process to specific ceramic components. A relatively simple electrical timing circuit and timing program, needed to operate the solenoid valves (1,2), can also be used to automatically interchange the processing atmospheres at any predetermined time during the thermal processing sequence.

The process can also be applied without substantial modifications to applications involving either box furnaces or continuously operating belt furnaces. Appropriate modifications needed in applying this technique to these types of furnaces are obvious and will not be treated here in more detail.

Other features of this invention will become apparent during the course of the following descriptions of exemplary embodiments which are given for illustration of the invention and are not intended to be limiting thereof.

EXAMPLE 1

An apparatus and equipment substantially equivalent to that shown in FIG. 1 was used to evaluate the process of the invention described herein. Several specimens, consisting primarily of the precursors needed to make the $YBa_2Cu_3O_x$ superconductor and containing an organic binder, were prepared. These specimens were prepared by premixing $Y_2O_3$, $BaCO_3$, and $CuO$ powders in an atomic Y/Ba/Cu ratio of 1/2/3 so that after an initial calcining procedure, in air, the $YBa_2Cu_3O_x$ compound would form from the initial mixture.

This mixture was heated in an alumina crucible, within a box furnace, to 950° C. in 1.5 hr, held at this temperature for 15 hr, and then allowed to cool slowly within the furnace. The cooling rate between 950° and 200° C. was approximately linear (with respect to time) and took about 4.0 hr. After this firing step, in an atmosphere consisting of air, a black ceramic-like porous mass of sintered material was produced.

The volume of this substance was about one-half the volume of the unfired grayish colored initial mixture. The fired mass of material was easily removed from the crucible, crushed, and then ground into a fine powder until it would pass through a standard 200 mesh screen.

Each test specimen was made by mixing 20 g of the finely ground powder described above and about 2.0 g of an organic powdered binder (Lucite Powder, Leco Part No. 811-133). This mixture was heated within a metallurgical sample press to 150° C. and compressed at a pressure of 287 atm for about 20 min at 150° C. and then allowed to cool to ambient temperatures. This procedure resulted in the production of hard, dense, "green" ceramic test disks. Each of these specimens were about 3.2 cm in diameter and 0.8 cm thick.

These test specimens were fired in a ceramic tube furnace (ca. 5.0 cm o.d.), similar to the one illustrated schematically in FIG. 1. Based upon the subsequent superconducting properties of these test specimens, very good firing/sintering results were obtained using the process and method of the invention disclosed herein.

One set of processing conditions (but by no means the only possible set of processing conditions) is described below to provide additional details regarding the process of the invention. This set of processing conditions involved initially heating the test disk (as shown in FIG. 1) in a flowing atmosphere of substantially pure nitrogen (ca 1.0 liter/min) containing about 1% (by volume) water vapor. Within this flowing atmosphere, the test specimen was initially heated from ambient temperature to 900° C. in 1.5 hr.

The sample was maintained at 900° C. in the same flowing atmosphere of nitrogen and water vapor for an additional period of 3.0 hr to facilitate a more complete reaction between residual carbon and the water vapor in the processing atmosphere. Then, a pure flowing atmosphere of substantially pure oxygen, (ca 1.0 liter/min) was substituted for the flowing atmosphere of nitrogen and water vapor.

The sample temperature was maintained at 900° C. for an additional period of 12 hr in the flowing atmosphere of substantially pure oxygen. Then, the sample specimen was allowed to slowly cool, in the flowing oxygen atmosphere, down to ambient temperature. The cooling rate was controlled so that the sample temperature would drop linearly (with respect to time) from 900° C. down to 200° C. in 7.0 hr.

Based upon the superconducting properties of specimens produced in this way, the process of the invention resulted in superconducting properties equivalent (at least) to properties obtained when pure oxygen or air alone was used throughout the firing/sintering cycle. However, the main advantage of the process described herein is that the practice of this invention is much safer than the use of an oxygen-rich (or pure oxygen) atmosphere during the binder burn out phase of the ceramic firing process.

EXAMPLE 2

Other ceramic specimens (as described under Example 1) were fired/sintered using the process of the invention disclosed herein. The process employed to produce one of these additional specimens is described below to more fully exemplify the process of the invention and possible modifications which are also capable of producing good results.

This specimen was heated from ambient temperature to 760° C. in 1.0 hr in a flowing atmosphere of nitrogen (ca. 1.0 l/min) containing about 1% (by volume) of water vapor. This sample was maintained at 760° C. in the same flowing atmosphere of nitrogen and water vapor for an additional period of 1.5 hr to facilitate a more complete reaction between residual carbon and water vapor in the processing atmosphere.

Then, a pure flowing atmosphere of substantially pure oxygen (ca. 1.0 liter/min) was substituted for the flowing atmosphere of nitrogen and water vapor. The sample temperature was maintained at 760° C. for an additional period of 1.5 hr in this atmosphere of substantially pure oxygen.

Then, in this same atmosphere of flowing oxygen, the sample was heated from 760° C. to 950° C. in 1.0 hr, held at 950° C. for 15 hr, and then cooled from 950° to 200° C. in about 7.0 hr. The cooling rate was controlled so that the decrease in sample temperature was linear with respect to time. Final cooling, between 200° C. and ambient temperatures, was allowed to occur spontaneously.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A process for firing a ceramic structure containing an organic component, comprising passing an inert gas containing a mild oxidizing agent which is either (ia) up to 50% by volume of water vapor or carbon dioxide, or (ib) up to 10% by volume of nitrous oxide or oxygen over a ceramic component containing an organic component, at a temperature sufficiently high to cause the firing of said ceramic structure and either the decomposition or the burning of the organic component, said mild oxidizing agent being present in an amount effective to effectuate said decomposition or burning.

2. A process for firing and sintering a ceramic structure containing an organic component, comprising:
   (i) passing an inert gas containing a mild oxidizing agent which is either (ia) up to 50% by volume of water vapor or carbon dioxide, or (ib) up to 10% by volume of nitrous oxide or oxygen over a "green" ceramic structure heated to a temperature sufficient to cause the decomposition or burning of said organic component, said mild oxidizing agent being present in an amount effective to effectuate said decomposition or said burning;
   (ii) thereafter passing a pure oxygen gas atmosphere or an oxygen-rich gas atmosphere over said "green" ceramic structure to remove any residual carbon left within said ceramic; and
   (iii) sintering said green ceramic structure.

3. The process of claim 1, wherein said organic component is an organic binder.

4. The process of claim 1, wherein said ceramic component containing an organic component is a "green" ceramic product.

5. The process of claim 1 or 2, wherein said inert gas is at least one member selected from the group consisting of nitrogen, helium and argon.

6. The process of claim 1 or 2, wherein said ceramic structure is a $YBa_2Cu_3O_x$ superconductor precursor.

7. The process of claim 1 or 2, wherein said mild oxidizing agent is water vapor or carbon dioxide.

8. The process of claim 1 or 2, wherein said mild oxidizing agent is nitrous oxide or oxygen.

9. The process of claim 1, wherein said mild oxidizing agent is a combination of at least one member selected from the group consisting of water vapor and carbon dioxide and at least one member selected from the group consisting of nitrous oxide and oxygen.

10. The process of claim 1, wherein said inert gas containing water vapor, carbon dioxide, nitrous oxide or oxygen is injected in a selected zone of a continuous belt furnace in which said ceramic structure is being fired.

* * * * *